A. FRANKENBERG.
CONE BELT SHIFTER.
APPLICATION FILED APR. 26, 1916.
1,196,850.
Patented Sept. 5, 1916.
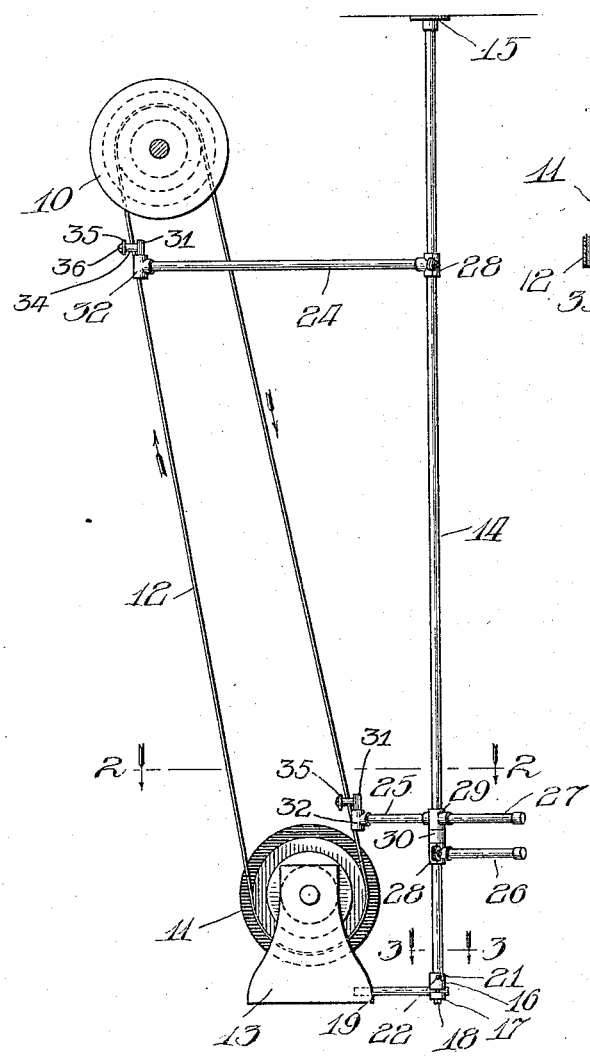
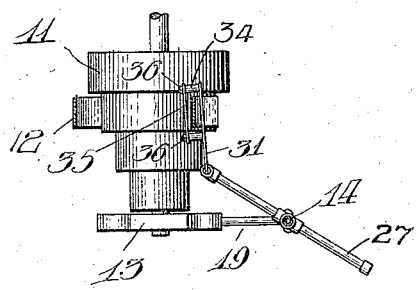
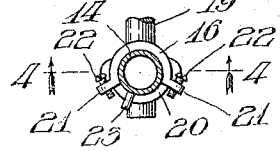
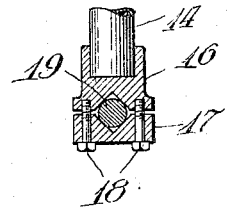
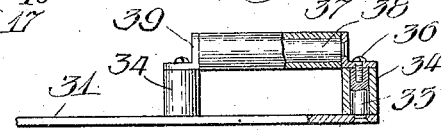
Witness:
H. S. Gaither
Inventor
Alfred Frankenberg
Miller Chindahl & Parker
Attys

UNITED STATES PATENT OFFICE.

ALFRED FRANKENBERG, OF ROCKFORD, ILLINOIS.

CONE BELT-SHIFTER.

1,196,850. Specification of Letters Patent. Patented Sept. 5, 1916.

Application filed April 26, 1916. Serial No. 93,582.

*To all whom it may concern:*

Be it known that I, ALFRED FRANKENBERG, a citizen of the United States, residing at Rockford, in the county of Winnebago and State of Illinois, have invented certain new and useful Improvements in Cone Belt-Shifters, of which the following is a specification.

This invention relates to devices for shifting belts on cone pulleys and the objects of the invention are to provide an improved device for this purpose in which the belt-inclosing frames are arranged to closely confine the belt so as to prevent twisting or turning of the belt, while at the same time the frames are constructed to minimize wear upon the belt, especially on the edges; to pivotally mount the belt-inclosing frame in such a way that the belt may automatically position the frame so as to run entirely free of the latter; to provide improved means for controlling the limits of movement of the belt-shifting-arms; and to produce a device of this character which is extremely simple and cheap to manufacture and at the same time is durable and efficient in action.

Further advantages and details of improvement will be pointed out in the following description.

In the accompanying drawings, Figure 1 is an elevational view illustrating two cone pulleys, a belt running thereover, and a belt-shifting device embodying the features of my invention. Fig. 2 is a sectional plan view taken in the plane of line 2—2 of Fig. 1. Fig. 3 is a detail section on line 3—3 of Fig. 1. Fig. 4 is a vertical sectional detail view taken in the plane of line 4—4 of Fig. 3. Fig. 5 is an enlarged plan view partially in section illustrating an alternative form of belt-inclosing frame.

In the drawings 10 and 11 indicate respectively an upper and a lower cone pulley, 12 an endless belt running over said pulleys, and 13 a support providing a bearing in which the lower pulley shaft is mounted.

My improved belt shifting device comprises a vertical shaft 14, the upper end of which is rotatably mounted in a suitable bearing 15 fixed to the ceiling of the room or other support. The lower end of the shaft 14 is rotatably seated in a thrust bearing 16 which in the present instance is clamped by means of a block 17 and bolts 18 to a horizontal rod 19 projecting from the support 13. The upper edge of the bearing 16 is cut away to provide a notch 20 and the bearing has outwardly projecting lugs 21 at opposite sides of said notch. Screws 22 are adjustably seated in the lugs 21. A stop pin 23 fixed in the vertical shaft 14 is arranged to abut against the tips of the screws 22 to limit the rotation of said shaft.

Mounted on the shaft 14 adjacent to the respective pulleys 10 11 are two arms 24 and 25 which carry at their free ends devices to engage the opposite stretches of the belt for shifting the same. In the drawings the belt is shown as traveling with the stretch distant from the shaft 14 running up and the other stretch down. The upper arm 24 is therefore in the present instance longer than the lower arm 25, but this is not essential.

The upper arm is rigidly fixed at its base to the shaft 14, while the lower arm is rotatable on said shaft. A handle 26 is rigidly fixed to the shaft 14 near its lower end and a handle 27 is fixed with relation to the arm 25 to rotate upon the shaft. All of the major parts of the device may conveniently be constructed of hollow piping, the arm 24 and the handle 26 being attached to the shaft 14 by T fittings 28 which are slotted and provided with ears adapted to be engaged by screws for clamping the fittings upon the shaft 14. The arm 25 and handle 27 may be secured in the lateral branches of a double T fitting 29 which rotatably surrounds the shaft 14. Said fitting 29 may be supported and spaced from the lower clamp 28 by means of a collar 30 on the shaft 14. It will be seen that the handles 26 and 27 are independently movable to shift the arms 24 and 25 one at a time.

The belt-engaging means is the same for both arms 24 and 25 and only one need be described. A bar 31 is pivoted at one end to the arm by suitable means such as a T fitting 32 on the end of the arm receiving a pivot stud carried by the bar. In the bar 31 are seated two spaced studs 33 each having a roller 34 loosely mounted thereon. A bar 35 spans the space between the roller studs and has its ends suitably secured to the studs 33 as by means of screws 36. These parts provide a closed frame which receives one stretch of the belt and is of such dimensions that it closely confines the belt and prevents twisting or turning of the belt to any great extent. More certain control of the belt is thus obtained. The rollers 34 which are mounted to rotate freely engage the edges of the belt in shifting the latter and minimize wear upon the belt. Inasmuch as belting is quite expensive, a belt shifter which will closely confine the belt so as to accurately control the belt and which at the same time does not injure the belt by undue wear thereon is highly advantageous. The device may be quickly associated with a belt by removing the bars 35 to allow the belt to be passed into the frames. Inasmuch as each frame as a whole is pivotally mounted on its arm 24 or 25, the belt, after being shifted, may position the frame so that the belt may run freely therethrough without contacting any part of the frame.

If desired, rollers may be provided to also contact the faces of the belt.

In Fig. 5, I have shown an alternative construction in which a roller 37 is mounted on a shaft 38, the ends of which are secured in brackets 39. These brackets are adapted to be attached to the studs 33 as by the screws 36.

In the use of the device, when it is desired to shift the belt, one of the handles 26 27 is swung in the proper direction, depending upon the movement of the belt desired. Assuming the handle 26 to be the one first moved, the shaft 14 is thereby rotated and the arm 24 swung to shift the upwardly-traveling run of the belt. The stud 23 cooperating with the stop screws 22 limits the extent to which the arm 24 may be swung and thereby prevents the belt from being accidentally thrown off the pulley. The handle 27 is then moved to swing the arm 25 and shift the belt on the lower pulley 11.

Inasmuch as practically all of the parts of the device may be made of stock material, such as piping, fittings, bars and rods, the device may be very cheaply manufactured without sacrificing any thing in the way of utility or durability.

I claim as my invention:

1. A cone belt shifter comprising, in combination, a vertical shaft, bearings for the upper and lower ends of said shaft, the lower bearing being notched and the shaft having a projection to lie in said notch and limit rotation of the shaft, an upper horizontal arm rigidly fixed to the shaft, a lower horizontal arm rotatably mounted on the shaft, a handle rigidly fixed to the shaft, another handle rigid with respect to the second mentioned arm and rotatable with relation to the shaft, and two belt-receiving frames each pivotally mounted on the free end of one of said arms and each arranged to closely confine one stretch of the belt, said frames comprising roller studs arranged to contact the edges of the belt in shifting the latter.

2. A cone belt shifter comprising, in combination, a vertical shaft, upper and lower bearings therefor, an upper horizontal arm rigidly fixed to the shaft and arranged to lie close to the upper pulley, a lower horizontal arm rotatably mounted on the shaft and arranged to lie close to the lower pulley, two frames each arranged to closely confine one stretch of the belt and each pivotally mounted on one of said arms, and two adjacent handles one of which is rigidly fixed to the shaft and the other of which is rigid with the lower one of said arms and is rotatable with respect to said shaft, the handles being arranged to swing the respective shifter arms.

3. A cone belt shifter comprising, in combination, a vertical shaft, an upper bearing therefor, a lower step bearing for such shaft having a cut-away portion at its upper edge and having lugs projecting outwardly from opposite sides of said cut-away portion, screws mounted in said lugs, a projection fixed to the shaft and arranged to abut against said screws to limit rotation of the shaft, upper and lower arms carrying belt-engaging devices, one of said arms being fixed to and the other rotatably mounted on said shaft, and means for swinging the respective arms.

4. A cone belt shifter comprising, in combination, a vertical shaft, upper and lower horizontal arms, one of which is fixed to and the other rotatably mounted on said shaft, means for swinging the respective arms, and two belt-engaging devices mounted one on each of the respective arms and each comprising a closed frame constructed to closely confine a stretch of the belt to prevent twisting or turning of the belt, the ends of said frame having rollers therein arranged to engage the edges of the belt in shifting the latter to minimize wear upon such edges.

5. A cone belt shifter comprising, in combination, a vertical shaft, upper and lower horizontal arms, one of which is fixed to and the other rotatably mounted on said shaft, means for swinging the respective arms, and two belt-engaging devices mounted one on each of the respective arms and each comprising a closed frame pivoted on the free end of its arm to swing freely in a horizontal plane and being constructed to closely confine the belt to prevent twisting or turning thereof, the ends of said frame having rollers adapted to engage the edges of the belt in shifting the latter so as to minimize wear upon such edges.

6. A cone belt shifter comprising, in combination, a vertical shaft, upper and lower horizontal arms, one of which is fixed to and the other rotatably mounted on said shaft, means for swinging the respective arms, and two belt-engaging devices mounted one on each of the respective arms and each comprising a closed frame pivoted on its arm to swing in a horizontal plane and equipped with rollers adapted to engage the edges and face of the belt and closely confine the belt while minimizing wear upon the latter.

In testimony whereof, I have hereunto set my hand.

ALFRED FRANKENBERG.

Copies of this patent may be obtained for five cents each, by addressing the "Commissioner of Patents, Washington, D. C."